United States Patent
Takamuki

[19]

[11] Patent Number: 6,136,520
[45] Date of Patent: Oct. 24, 2000

[54] SILVER HALIDE PHOTOGRAPHIC ELEMENT AND A PROCESSING METHOD OF THE SAME

[75] Inventor: Yasuhiko Takamuki, Hino, Japan

[73] Assignee: Konica Corporation, Japan

[21] Appl. No.: 09/211,174

[22] Filed: Dec. 14, 1998

[30] Foreign Application Priority Data

Dec. 18, 1997 [JP] Japan .................................. 9-349422

[51] Int. Cl.⁷ .............................. G03C 1/76; G03C 1/31; G03C 1/38; G03C 1/34
[52] U.S. Cl. .......................... 430/523; 430/546; 430/631; 430/634; 430/950; 430/963
[58] Field of Search .................... 430/510, 523, 430/546, 631, 634, 950, 963

[56] References Cited

U.S. PATENT DOCUMENTS

| | | | |
|---|---|---|---|
| 3,920,456 | 11/1975 | Nittel et al. | 430/950 |
| 3,945,829 | 3/1976 | Zorn et al. | 430/510 |
| 4,399,213 | 8/1983 | Watanabe et al. | 430/950 |
| 4,886,738 | 12/1989 | Deguchi et al. | 430/510 |
| 5,204,219 | 4/1993 | Ooij et al. | 430/272.1 |
| 5,478,709 | 12/1995 | Vandenabeele | 430/523 |
| 5,494,774 | 2/1996 | Ali et al. | 430/202 |
| 5,792,600 | 8/1998 | Nagami | 430/631 |
| 5,821,042 | 10/1998 | Massirio et al. | 430/510 |

FOREIGN PATENT DOCUMENTS

| | | |
|---|---|---|
| 0693710 | 1/1996 | European Pat. Off. . |
| 2232773 | 3/1975 | France . |
| 2012978 | 1/1979 | United Kingdom . |

OTHER PUBLICATIONS

European Search Report EP 98 12 3538.
"High Speed Process . . . ", *Research Disclosure* No. 16744 vol. 1667, Mar. 1978, pp. 13 & 14.

*Primary Examiner*—Richard L. Schilling
*Attorney, Agent, or Firm*—Jordan B. Bierman; Bierman, Muserlian and Lucas

[57] ABSTRACT

A photographic element is disclosed. The element comprises fine composite particles composed of fine inorganic particles bonded with a high boiling point compound. An excellent photographic element which exhibits high sensitivity, minimum fog, improved pressure resistance, no roller marks, and sufficient layer strength, all under low-replenished processing, protecting environmental pollution is obtained.

16 Claims, No Drawings

SILVER HALIDE PHOTOGRAPHIC ELEMENT AND A PROCESSING METHOD OF THE SAME

FIELD OF THE INVENTION

The present invention relates to a silver halide photographic element and a processing method of the same, and specifically to a silver halide photographic element which exhibits high sensitivity, minimum fog, excellent pressure resistance, and excellent layer strength under ultrarapid processing of a total processing time of not more than 30 seconds, in which particularly, the developer replenishment rate is decreased, and a processing method of the same.

BACKGROUND OF THE INVENTION

In recent years, along with the progress of electronics, the access time to images has been markedly shortened and rapid processing has been increasingly demanded of the silver halide photographic elements.

In order to enable the photographic element to be suitable for quick processing, conventionally, a technique is known in which development rate, fixing rate, water washing rate, and drying rate are enhanced by reducing the amount of gelatin employed as a binder to protect and disperse silver halide grains. However, when the employed amount of gelatin is reduced, highly sensitive silver halide grains are further decreased in their resistance to external pressure. Thus, problems occur during automatic processing, that density unevenness composed of many fine spots, termed a roller mark, is caused due to pressure applied by surface irregularities of conveyance rollers in the development tank of the automatic processor. Thus, as a technique to solve problems such as the above, for example, Japanese Patent Publication Open to Public Inspection No. 9-218488 discloses composite grains in the form of core/shell in which colloidal silica is employed as a core and an organic polymer is employed as a shell, and this technique has been proven to minimize the roller marks. However, it has been found that improvement in photographic performance is not fully realized because a decrease in the binder amount is not fully effected due to sharing of organic polymers having a binder-like character.

Recently, on the other hand, global environmental contamination has been taken up as a global issue; inside and outside our country, wastes have been of much concern, and responsibility for enterprises has been argued. In such circumstances, a decrease in photographic processing solution waste has become an urgent problem.

As a means to solve the problem mentioned above, conventionally, techniques have been disclosed, for example in Japanese Patent Publication Open to Public Inspection No. 4-291252, in which silver halide grains are shaped into a tabular form or silver halide grains undergo selenium sensitization. Furthermore, silver halide grains comprised of silver chloride are advantageously employed for low-replenished processing because accumulation effect to a developer can be improved due to the fact that silver chloride is readily developed and the effect of chlorine ions to the developer is insignificant compared to bromine ions and iodine ions.

However, the replenishment rate is not sufficiently decreased employing these techniques. When the replenishment rate is further decreased, the above-mentioned pressure resistance is further degraded. Furthermore, even though combined with the above-mentioned fine composite grain technique, it has been found that in an ultrarapid and low-replenished processing in which the developer replenishment rate is 35 to 98 ml per m² of photographic element and the total processing time is not more than 30 seconds, it is difficult to achieve high sensitivity, minimum fog, pressure resistance, and layer strength as demanded.

SUMMARY OF THE INVENTION

An object of the present invention is to provide a photographic element which exhibits high sensitivity, minimum fog, improved pressure resistance, no roller marks, and sufficient layer strength, all under low-replenished processing, protecting environmental pollution, and a processing method of the same.

The invention and its embodiment are described below.

The photographic element comprises at least one silver halide emulsion layer and at least one nonlight-sensitive hydrophilic colloidal layer provided on a support. The silver halide photographic element comprises fine inorganic particles bonded with a high boiling point compound in at least one of the emulsion layer or the nonlight-sensitive hydrophilic colloidal layer.

The fine inorganic particles bonded with a high boiling point compound is preferably contained in at least one of the emulsion layer.

The high boiling Point compound preferably has a phosphoric acid or phthalic acid portion in the structure.

The silver halide photographic element is preferably processed by a processing method wherein that an automatic processor is employed which performs total processing within 10 to 30 seconds, with a developer replenishment rate of 35 to 98 ml per m² of photographic element.

The preferable example of the high boiling point compound is represented by the following formula (I) or (II).

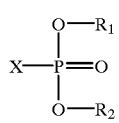
(I)

In the formula, X is a halogen atom or $OR_3$; and $R_1$, $R_2$ and $R_3$ are independently a hydrogen atom, an alkyl group which may be substituted or non-substituted, or an aryl group which may be substituted or non-substituted, provided that $R_1$ $R_2$ are not hydrogen atom at the same time.

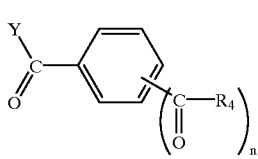
(II)

In the formula, Y is a halogen atom, and $R_4$, is a halogen atom or $OR_5$, wherein $OR_5$ is an alkyl group which may be substituted or non-substituted, or an aryl group which may be substituted or non-substituted; n is 1 or 2.

DETAILED DESCRIPTION OF THE INVENTION

The present invention will now be explained in detail. The fine inorganic particles bonded with a high boiling point compound as described herein denote those in which a high boiling point compound is covalently bonded with surfaces of fine inorganic particles.

The high boiling point compound has a boiling point of not lower than 100° C., and has a group which can form a covalent bond with the surfaces of fine inorganic particles, of these, compounds are preferred which form phosphoric acid esters or phthalic acid esters. Preferable examples are represented by the following formula (I) or (II).

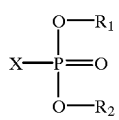

(I)

In the formula, X is a halogen atom or $OR_3$; and $R_1$, $R_2$ and $R_3$ are independently a hydrogen atom, an alkyl group which may be substituted or non-substituted, or an aryl group which may be substituted or non-substituted, provided that $R_1$ $R_2$ are not hydrogen atom at the same time.

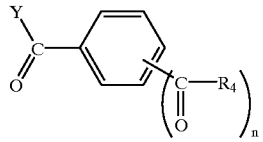

(II)

In the formula, Y is a halogen atom, and $R_4$, is a halogen atom or $OR_5$, wherein $OR_5$ is an alkyl group which may be substituted or non-substituted, or an aryl group which may be substituted or non-substituted; n is 1 or 2.

In the formulae (I) and (II) the halogen atom includes F, Cl, Br, I and At, and preferable example is Cl. Preferable examples of alkyl group include those having straight or branched chain composed of 2 to 30 carbon atoms which may form a ring. The aryl group includes a phenyl, naphtyl and anthranyl group, and preferable example is a phenl group. The substituent for alkyl or aryl group includes an alkyl, acyl, alkenyl, alkinyl, aryl and hetereocyclic group, each of which may be substituted by a halogen atom to make the compound reactive. The preferable examples are alkyl or phenyl substituted by alkyl group.

The molecular weight of the compound is preferably 100 to 1000, and more preferably 200 to 6000. The compound may be employed solely or in combination.

Preferred examples are shown below.

PA-1

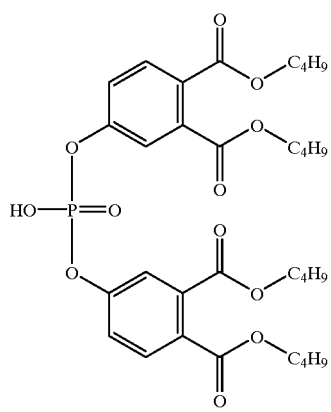

PA-2

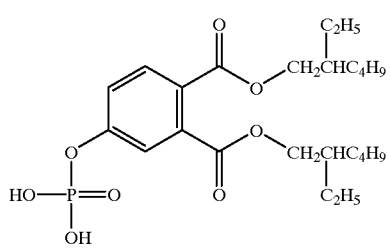

PA-3

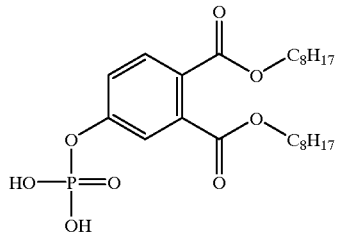

PA-4

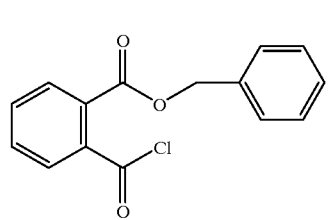

PA-5

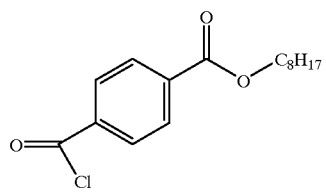

PA-6

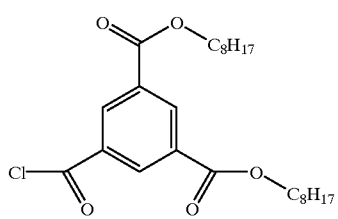

PA-7
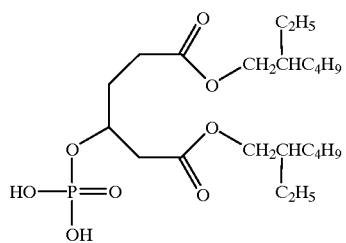
PA-8
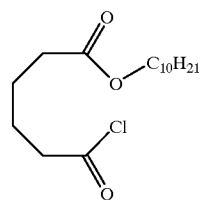
PA-9
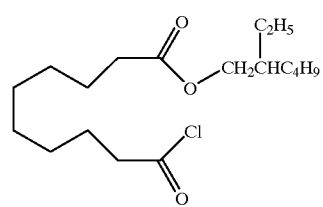
PA-10
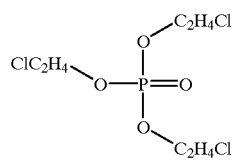
PA-11
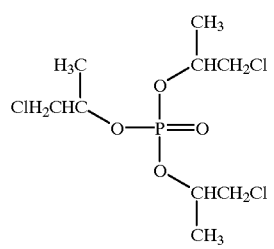
PA-12
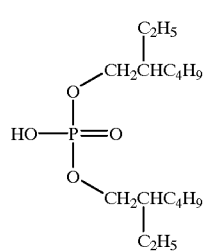
PA-13
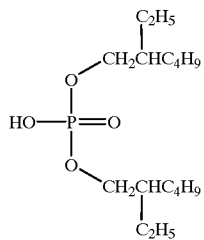
PA-14
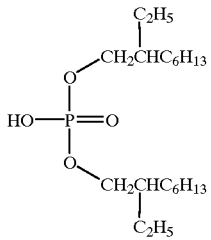
PA-15
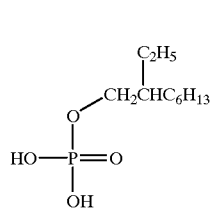
PA-16
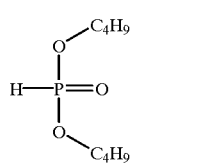
PA-17
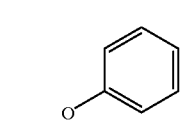
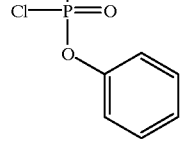
PA-18
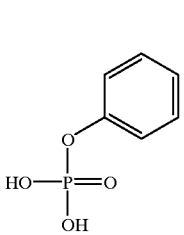

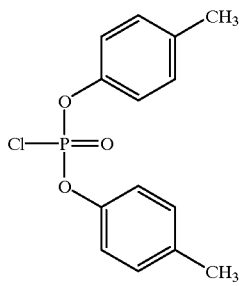

PA-19

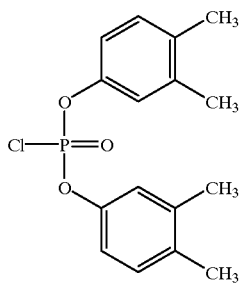

PA-20

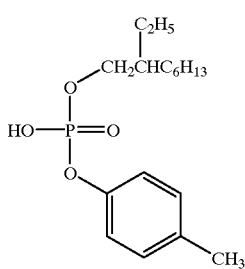

PA-21

The fine inorganic particles employed in the present invention are those in which the main components are oxides of those selected from silicon, aluminum, titanium, indium, yttrium, tin, antimony, zinc, nickel, copper, iron, cobalt, manganese, molybdenum, niobium, zirconium, vanadium, alkali metals, or alkali earth metals, etc. Of these, from the point of transparency and hardness, preferred are silicon oxides (colloidal silica), antimony oxides, titanium oxides, zinc oxides, tin oxides, vanadium oxides, yttrium oxides, aluminum oxides, and titanium oxides. Shapes are preferably spherical particle or amorphous particle as well as tabular and needle shaped. As to the tabular shape, tabular silica is cited. The tabular silica denotes laminar silicate salts containing alkali or alkali earth metals, aluminum, etc., in addition to those described in detail in Japanese Patent Publication Open to Public Inspection No. 7-64232. Synthetic clay is also included in this category, which is described in Japanese Patent Publication Open to Public Inspection No. 7-92606. Specific examples include kaolinite, dickite, nacrite, halloysite, serpenite, pyrophyllite, talc, mucovite, swelling synthetic fluoromica, sericite, chlorite, smectite, vermiculite, swelling fluorovermiculite, etc., with an average particle diameter of 1 nm to 5 μm.

Specific examples are described below.
CA-1 Colloidal silica (average particle diameter of 14 nm)
CA-2 Antimony pentaoxide sol (average particle diameter of 30 nm)
CA-3 Smectite (average particle diameter of 300 nm×1 nm)
CA-4 Swelling synthetic fluoromica (average particle diameter of 3 μm×0.2 μm)
CA-5 Tin oxide sol (average particle diameter of 30 nm)
CA-6 Zinc oxide sol (average particle diameter of 10 nm)
CA-7 Aluminum oxide sol (average particle diameter of 200 nm)
CA-8 Zirconium oxide sol (average particle diameter of 500 nm)
CA-9 yttrium oxide sol (average particle diameter of 30 nm)
CA-10 Niobium oxide sol (average particle diameter of 30 nm)
CA-11 Titanium oxide sol (average particle diameter of 20 nm)

The fine inorganic particles bonded with a high boiling point compound are prepared by adding a high boiling point compound to fine inorganic particles dispersed in an organic solvent, mixing and stirring them. A catalyst may be added or the mixture may be heated if necessary. In this procedure, the high boiling point compound and the fine inorganic particles form chemical bonding. After reacting, the organic solvent employed in the reaction is removed, and in the presence of a dispersion stabilizer, the resulting mixture is dispersed at normal or elevated temperature employing a homogenizer such as a homomixer, a colloid mill, an impeller, etc., if desired, with the addition of a small amount of volatile organic solvents compatible with water, such as alcohols, ethyl acetate, etc., to obtain an aqueous dispersion.

Organic solvents employed in the present invention include alcohols (for example, methanol, ethanol, isopropanol, 2-methoxy-1-propanol, butanol, t-butanol, pentanol, neopentanol, cyclohexanol, 1-methoxy-2-propanol), ethylene glycol, ethylene glycol mono-n-propyl ether, dimethylformamide, dimethylacetamide, acetone, methyl ethyl ketone, methyl isobutyl ketone, acetonitrile, tetrahydrofuran, dioxolan, ethyl acetate, toluene, xylene, etc. These organic solvents may be employed individually or in combination. In some cases, these may be employed in combinations with other organic solvents.

Dispersion stabilizers preferably employed in the present invention include anionic surface active agents and/or polymer dispersion stabilizers. The anionic surface active agents employed in the present invention include higher fatty acid alkali metal salts such as sodium laurate, sodium stearate, sodium oleiate, etc., higher alcohol sulfuric acid ester sodium salts such as lauryl sulfuric acid ester sodium salt, cetyl sulfuric acid ester sodium salt, etc., higher alkyl ether sulfuric acid ester salts such as lauryl alcohol ethylene oxide addition product sulfuric acid ester salt, etc., sulfonated oils, sulfonated fatty acid esters, sulfonated fatty acids, sulfonated olefin, sodium alkylbenzenesulfonate salts such as sodium benzenesulfonate, etc.; alkylarylsulfonic acid salts, formalin condensation naphthalene sulfonic acid salts, α-olefin sulfonic acid salts, oleyl(N-methyl)taurides, sulfosuccinic acid diester type surface active agents such as sulfosuccinic acid di-2-ethylhexyl ester sodium, etc., higher alcohol phosphoric acid monoester disodium salts, higher alcohol phosphoric acid diester monosodium salts, phosphoric acid ester sodium salts of a higher alcohol ethylene oxide addition product, zinc dialkyldithiophosphate, etc. Of these, preferably employed are alkylbenzenesulfonic acid sodium salts, alkylarylsulfonic acid salts, sulfosuccininc acid diester type surface active agents, and phosphoric acid ester sodium salts of a higher alcohol ethylene oxide addition product.

Furthermore, in the present invention, as the dispersion stabilizers, polymer dispersion stabilizers may be employed individually or in combination. Preferred polymer dispersion stabilizers include proteins such as gelatin, colloidal albumin, casein, sugar derivatives such as agar-agar, sodium alginate, starch derivatives, etc., cellulose compounds such as carboxymethyl cellulose, hydroxymethyl cellulose, etc., single polymers or copolymers having an ethylenic unsaturated monomer as a composition element such as polyvinyl alcohol, end long chain alkyl modified polyvinyl alcohol, N-vinylpyrrolidone, acrylic acid, methacrylic acid, maleic acid, acrylic acid β-hydroxyethyl, methacrylic acid β-hydroxyethyl, p-styrenesulfonic acid, isoprene sulfonic acid, 2-acrylamido-2-methylpropane sulfonic acid, vinyl alcohol, methyl vinyl ether, acrylamide, methacrylamide, diacetone acrylamide, vinyl imidazole, styrene, or synthetic hydrophilic polymers such as polyoxyethylene, polyoxypropylene, poly-2-methyloxazolidine, etc. Furthermore, as the polymer dispersion stabilizers, graft polymers or block polymers may be employed in which the anchor group and the dispersion stabilizing group are separated. Of these, gelatin is particularly preferred.

The preferred molecular weight of the polymer dispersion stabilizer is to be in the range of 2,000 to 800,000 and the preferred concentration is in the range of 0.05 to 50 g/liter.

The weight ratio of the high boiling point compound to fine inorganic particles is preferably 0.1 to 100 weight percent, more preferably 10 to 50 weight percent. High boiling point compounds may be employed individually or in combination.

The number average diameter of the composite particles is preferably 0.005 to 5 µm, and more preferably 0.01 to 1 µm. Beyond this range, the pressure resistance becomes insufficient.

The added amount to the photographic element of the composite particles is 0.1 to 10 g/m², and is preferably between 0.1 and 1.5 g/m².

Further, during the preparation of an aqueous dispersion, dispersion may be carried out along with the high boiling point compounds described below. In such cases, attention should be paid to the addition amount so that the high boiling point compound adheres onto the surfaces of fine inorganic particles of the present invention and droplets composed only of the high boiling point compound are not formed. In that case, the amount is preferably between 1 and 100 percent by weight in respect to the weight of the fine inorganic particles of the present invention, depending though on the particle diameters.

The high boiling point compounds as described herein denote those which have a boiling point of not less than 100° C. and are employed when hydrophobic compounds such as couplers, etc. are dispersed, and include phthalic acid esters such as dibutyl phthalate, di-N-octyl phthalate, etc., trimettic acid esters such as tri-2-ethylhexyltrimellitate, etc., aliphatic dibasic acid esters such as dibutyl adipate, phosphoric acid esters such as tributyl phosphate, tricresyl phosphate, etc., acetic acid esters such as 2-ethylhexyl acetate, etc., sulfonamides such as N-butylbenzenesulfonamide, etc. Of these, phthalic acid esters and phosphoric acid esters are preferred.

The synthesis examples of fine inorganic particles are described below, with which the high boiling point compound of the present invention is bonded.

(Synthesis of K-1)

In 500 ml of a three-necked flask equipped with a stirring device, a thermometer, and a reflux cooling tube, 270 g (CA-1 solid concentration of 20 weight percent) of CA-1 dispersed into dimethylacetamide and 2.28 g of triethylamine were placed. With stirring under a flow of nitrogen gas, 6.0 g of PA-17 were added and heated continuously for 7 hours. After cooling to room temperature, the resulting mixture was added to distilled water to deposit reaction products, and the deposit was washed employing distilled water to remove solvents. Added to 240 ml of distilled water, were the resulting reaction products and 0.5 g of sodium dodecylbenzenesulfonate as a dispersion stabilizer. After adjusting the pH to 6.5, the resulting mixture was dispersed employing a high speed stirrer (ULTRA-TURRAX T25 manufactured by JANKE & KUNKEL IKA Lab.) and then filtered to obtain 290 g of a dispersion having a solid portion of 19.5 weight percent. (yield of 93.5 percent)

(Synthesis of K-2)

In the same manner as K-1, reaction products CA-1 and PA-17 were obtained. To 280 ml of distilled water, the resulting reaction products, 6.0 g of tricresyl phthalate, and 0.4 g of sodium dodecylbenzenesulfonate as a dispersion stabilizer were added and after adjusting the pH to 6.5, the resulting mixture was dispersed employing a high speed stirrer (ULTRA-TURRAX T25 manufactured by JANKE & KUNKEL IKA Lab.) and then filtered to obtain 340 g of a dispersion having a solid portion of 18.5 weight percent. (yield of 94.7 percent)

(Synthesis of K-13)

In 500 ml of a three-neck flask equipped with a stirring device, a thermometer, and a reflux cooling tube, 300 g (CA-11 solid concentration of 20 weight percent) of CA-11 dispersed into acetonitrile, and 0.5 g of concentrated sulfuric acid were placed. With stirring under a flow of nitrogen gas, 40.0 g of PA-2 was added and heated continuously for 5 hours. After cooling to room temperature, the resulting mixture was added to distilled water to deposit reaction products, and he deposit was washed employing distilled water to remove all solvents. Added to 400 ml of distilled water, were the resulting reaction products and 0.7 g of sulfosuccinic acid di-2-ethylhexyl ester sodium as a dispersion stabilizer. After adjusting the pH to 6.5, the resulting mixture was dispersed employing a high speed stirrer (ULTRA-TURRAX T25 manufactured by JANKE & KUNKEL IKA Lab.) and then filtered to obtain 490 g of a dispersion having a solid portion of 19.0 weight percent. (yield of 92.5 percent)

(Synthesis of K-14)

In the same manner as K-13, reaction products CA-11 and PA-2 were obtained. To 380 ml of distilled water, the resulting reaction products, 20.0 g of di-2-ethylhexyl phthalate, and 0.6 g of sulfosuccinic acid di-2-ethylhexyl ester sodium, and 10.0 g of alkali-treated gelatin were added and after adjusting the pH to 6.5, the resulting mixture was dispersed employing a high speed stirrer (ULTRAX-TURRAX T25 manufactured by JANKE & KUNKEL IKA Lab.) and then filtered to obtain 490 g of a dispersion having a solid portion of 23.0 weight percent. (yield of 93.9 percent)

Table 1 shows specific examples of fine organic particles with which the high boiling point compounds of the present invention are bonded.

TABLE 1

| No. | Fine Inorganic Particles (B) | High Boiling Point Compound (A) | High Boiling Point Compound Employed during Dispersion (C) | Weight Ratio (A/B/C) |
| --- | --- | --- | --- | --- |
| K-1 | CA-1 | PA-17 | — | 90/10/0 |
| K-2 | CA-1 | PA-17 | tricresyl phosphate- | 82/9/9 |
| K-3 | CA-1 | PA-17 | — | 82/18 |
| K-4 | CA-1 | PA-17 | — | 95/5 |
| K-5 | CA-1 | PA-17 | — | 50/50 |
| K-6 | CA-1 | PA-1 | — | 60/40 |
| K-7 | CA-1 | PA-6 | — | 70/30 |
| K-8 | CA-1 | PA-7 | — | 85/15 |
| K-9 | CA-1 | PA-7 | di-2-ethylhexyl adipate | 65/25/10 |
| K-10 | CA-1 | PA-11 | — | 90/10 |

TABLE 1-continued

| No. | Fine Inorganic Particles (B) | High Boiling Point Compound (A) | High Boiling Point Compound Employed during Dispersion (C) | Weight Ratio (A/B/C) |
|---|---|---|---|---|
| K-11 | CA-1 | PA-14 | — | 80/20 |
| K-12 | CA-1 | PA-21 | — | 70/30 |
| K-13 | CA-11 | PA-2 | — | 60/40 |
| K-14 | CA-11 | PA-2 | di-2-ethylhexyl phthalate | 50/33/17 |
| K-15 | CA-3 | PA-12 | — | 80/20 |
| K-16 | CA-3 | PA-17 | — | 90/10 |
| K-17 | CA-7 | PA-2 | — | 80/20 |
| K-18 | CA-7 | PA-17 | — | 90/10 |

As a binder for the silver halide emulsion layer and other hydrophilic colloidal layers of the present invention, gelatin is employed. However, hydrophilic colloids other than gelatin can be employed in combination, and include, for example, gelatin derivatives, graft polymers of gelatin with other polymers, proteins such as albumin, casein, etc., cellulose derivatives such as hydroxyethyl cellulose, carboxymethyl cellulose, methyl cellulose, cellulose sulfuric acid ester, etc., sugar derivatives such as sodium alginate, starch derivatives, dextran, dextrin, etc., synthetic hydrophilic polymers such as polyvinyl alcohol, polyvinyl alcohol partial acetal, poly-N-vinyl pyrrolidone, polyacrylic acid, polymethacrylic acid, polyacrylamide, polyvinyl imidazole, polyvinyl pyrazole, etc. In addition to the alkali-treated gelatin, acid-treated gelatin may be employed and gelatin hydrolysates and gelatin enzyme degradation products may also be employed. The gelatin amount in the total hydrophilic colloidal layer is preferably between 1.3 and 2.5 g/m$^2$ on one side of a support and most preferably between 1.5 and 2.3 g /m$^2$.

As for the silver halide grains of the emulsion, in order to obtain high sensitivity, tabular grains are preferably employed. Regarding silver halide compositions, employed optionally are AgBr, AgCl, AgClBr, AgClBrI, AgBrI, AgClBrI, etc., however, either AgBr or AgClBr is preferred.

Tabular grains are described in U.S. Pat. Nos. 4,439,520, 4,425,425, 4,414,304, etc. and desired tabular grains are readily prepared. The tabular grains can be subjected to epitaxial growth of different composition silver halides in specified surface locations, and can also be subjected to sharing. Furthermore, in order to control sensitivity specks, the tabular grains may be subjected to formation of dislocation lines on the surface or in the interior of the grain.

Regarding silver halide grains, not less than 50 percent of the total of projection area of all the silver halide grains in a layer is preferably occupied by tabular grains having an aspect ratio of not less than 2. Specifically, as the ratio of tabular grains increases from 60 to 70 percent, and still farther to 80 percent, preferred results are obtained. The aspect ratio as described herein denotes a ratio of the diameter of a circle having the same area as the projection area of a tabular grain, to the distance between two parallel planes. In the present invention, the aspect ratio is preferably from not less than 2 to less than 20 and is more preferably from not less than 3 to less than 16.

The thickness of the tabular grain is preferably not more than 0.5 micron, and is more preferably not more than 0.3 micron. Furthermore, regarding the distribution of tabular grains, a monodisperse emulsion is preferred which has a frequently employed variation coefficient (when a projection area is approximated to a circle, 100 times the value S/D, obtained by dividing standard deviation S by diameter D) of not more than 30 percent, and most preferred not more than 20 percent. Particularly, a monodisperse emulsion having a variation coefficient of not more than 20 percent is preferred. Furthermore, tabular grains may be mixed with two or more non-tabular grains in normal crystal shapes having non-parallel planes.

During formation of tabular grains, in order to control grain growth, employed may be silver halide solvents, for example, ammonia, thioether compounds, thione compounds, etc. Furthermore, physical and chemical ripening can be carried out in the presence of metals such as zinc, lead, thallium, indium, rhodium, etc.

When not less than 50 percent of the total projection area of silver halide grains satisfies conditions described below, preferred results are obtained in terms of low-replenished processing.
a) the parallel principal plane is a (100) plane and the aspect ratio is not less than 2
b) silver chloride content is preferably not less than 20 mole percent, and is more preferably between 30 and 70 mole percent. Further preferably, tabular grains which satisfy the above-mentioned conditions occupy not less than 80 percent of the total projection area.

The principal plane as described herein is substantially a set of parallel planes having the maximum area among crystal surfaces forming a cubic emulsion grain, and the aspect ratio as described is a ratio of the average edge length forming the principal plane of a grain to the thickness between the principal planes.

The average edge length of the principal plane is obtained, for example, by measuring the edge length of a grain on the print or the projected area upon taking the grain picture magnified to 10,000 to 50,000 times employing an electron microscope. (the number of measured grains randomly selected should be not less than 10,000) Furthermore, the grain thickness is obtained by measuring an electron microscopic picture prepared in the same way as the above.

The principal plane so as to be a (100) plane can be identified by employing an electron diffraction method or an X-ray diffraction method. Furthermore, through electron microscopic observation, the grain having a (100) principal plane can be identified by finding that the principal plane is an orthogonal square (square or rectangular).

The silver halide photographic emulsion is prepared employing:
(a) a process to form nuclei for tabular grains by introducing silver salts and silver halides into a dispersion medium,
(b) following the nuclei formation, a process to carry out the Ostwald ripening under the conditions which hold the (100) principal plane of the tabular grain, and
(c) a process to carry out grain growth so as to obtain the desired grain diameter and silver chloride content ratio.

During nuclei formation, as a method to allow halide salts to react on a silver salt, a double jet method (simultaneous mixing method) is preferably employed.

During grain growth, the double jet method is also employed and as one type of the double jet method, a method in which the pAg in the liquid phase forming silver halides is kept constant, that is, a controlled double jet method can be employed. When this method is employed, a silver halide emulsion is obtained in which the crystal form is regular and the grain size is nearly uniform.

When a silver halide emulsion is prepared, a part or entire process during grain growth may be a grain growth process carried out by supplying fine silver halide grains.

The grain sizes of fine grains manage the supply rate of halide ions. Though the preferred grain size depends on the size and halogen composition of host silver halide grains, those having an average circular equivalent diameter of not more than 0.3 μm are employed. The more preferred diameter is not more than 0.1 μm. In order that fine grains are subjected to laminar deposition onto the host grain through recrystallization, the sizes of fine grains are preferably smaller than the circular equivalent diameter of the host grain, and more preferably not more than 1/10 of this circular equivalent diameter.

After the growth completion of silver halide grains, the silver halide emulsion to be employed may be subjected to noodle washing, flocculation washing, etc. to remove the water-soluble salts so as to obtain the pAg ion concentration suitable for chemical ripening. Preferred water washing methods include, for example, a method employing aromatic hydrocarbon series aldehyde resins containing a sulfo group as described in Japanese Patent Publication No. 35-16086, or a desalting method employing exemplified G-3, G-8, etc., polymer flocculating agents, described in Japanese Patent Publication Open to Public Inspection No. 2-7037. Furthermore, desalting may be carried out employing an ultrafiltration method described in Research Disclosure (RD) Vol. 102, 1972, October Issue, Item 102 and Vol. 131, 1975, March Issue, Item 13122.

As chemical sensitization for emulsions, selenium sensitization or tellurium sensitization is preferably carried out. Selenium sensitizers employed in the present invention include a wide range of selenium compounds. These compounds are described, for example, in U.S. Pat. Nos. 1,574,944, 1,602,592, and 1,623,499, and Japanese Patent Publication Open to Public Inspection Nos. 60-150046, 4-25832, 4-109240, 4-147250, etc. Useful selenium sensitizers include colloidal metallic selenium, isoselenocyanates (for example, allylisoselenocyanate, etc.), selenoureas (for example, N,N-dimethylselenourea, N,N,N'-triethylselenourea, N,N,N'-trimethyl-N'-heptafluoroselenourea, N,N,N'-trimethyl-N'-heptafluoroprpylcarbonylselenourea, N,N,N'-trimethyl-N'-4-nitrophenylcarbonylselenourea, etc.), selenoketones (for example, selenoacetone, selenoacetophenone, etc.), selenoamides (for example, selenoacetamide, N,N-dimethylselenobenzamide, etc.), selenocarboxylic acids and selenoesters (for example, 2-selenopropionic acid, methyl-3-selenobutylate, etc.), selenophosphates (for example, tri-p-triselenophosphate, etc.), selenides (diethyl selenide, diethyl diselenide, triphenylphosphine selenide, etc.). Particularly preferred selenium sensitizers are selenoureas, selenoamides, and selenoketones.

Specific examples of techniques employing these selenium sensitizers are disclosed in patent specifications described below; that is, U.S. Pat. Nos. 1,57,944, 1,602,592, 1,623,499, 3,297,446, 3,297,447, 3,320,069, 3,408,196, 3,408,197, 3,442,653, 3,420,760, and 3,591,385; French Patent Nos. 2693038 and 2093209; Japanese Patent Publication Nos. 52-34491, 52-34492, 53-295, and 57-22090; and Japanese Patent Publication Open to Public Inspection Nos. 59-180536, 59-185330, 59-181337, 59-187338, 59-192241, 60-150046, 60-151637, 61-246738, 3-4221, 3-24537, 3-111838, 3-116132, 3-148648, 3-237450, 4-16838, 4-25832, 4-32831, 4-96059, 4-109240, 4-140738, 4-140739, 4-147250, 4-149437, 4-184331, 4-190225, 4-191729, and 4-195035; and U.K Patent Nos. 255846 and 861984. Further, the disclosure is made in scientific publications such as H. E. Spencer et al, Journal of Photographic Science, Vol. 31, pages 158 to 169, (1983), etc.

Though the added amount of the selenium sensitizer depends on an employed selenium compound, silver halide grains, chemical ripening conditions, etc., $10^{-8}$ to $10^{-4}$ mole per mole of silver halide is generally employed. Furthermore, a selenium compound may be dissolved in water or any of organic solvents such as methanol, ethanol, ethyl acetate, etc., or in combination thereof, corresponding to the properties of the selenium compound employed and added. Or the selenium compound may be previously mixed with a gelatin solution and added or added employing a method disclosed in Japanese Patent Publication Open to Public Inspection No. 4-140739, in which the selenium compound is added in the form of emulsified dispersion of a mixture consisting of an organic solvent-soluble polymer and a mixed solution.

The temperature of chemical ripening employing the selenium sensitizer is preferably in the range of 40 to 90° C. and more preferably in the range of 45 to 80° C. Furthermore, the pH is preferably in the range of 4 to 9 and the pAg is preferably in the range of 6 to 9.5.

Tellurium sensitizers and sensitization are disclosed in U.S. Pat. Nos. 1,623,499, 3,320,069, 3,772,031, 3,531,289, and 3,655,349; U.K. Patent Nos. 235,211, 1,121,496, 1,295, 462, and 1,396,696; Canadian Patent No. 800,958; and Japanese Patent Publication Open to Public Inspection Nos. 4-204640 and 4-333043, etc. Examples of useful tellurium sensitizers include telluroureas (for example, N,N-dimethyltellurourea, tetramethyltellurourea, N-carboxyethyl-N,N'-dimethyltellurourea, N,N'-dimethyl-N'phenyltellurourea), phosphine tellurides (for example, tributylphosphine telluride, tricyclohexylphosphine telluride, triisopropylphosphine telluride, butyl-diisopropylphosphine telluride, dibutylphenylphosphine telluride), tellroamides (for example, telluroacetamide, N,N-dimetyltellurobenzamide), telluroketones, telluroesters, isotellurocyanates, etc. Techniques employing tellurium sensitizers are in the same manner as the selenium sensitizers.

Furthermore, the selenium sensitization may be employed in combinations with sulfur sensitization, reduction sensitization, and noble metal sensitization.

As sulfur sensitizers, sulfur sensitizers can be employed, which are described in U.S. Pat. Nos. 1,574,944, 2,410,689, 2,278,947, 2,728,668, 3,501,313, and 3,656,955; West German Patent Application for Public Inspection (OLS) No. 1,422,869; and Japanese Patent Publication Open to Public Inspection Nos. 56-24937 and 55-45016, etc. As specific examples, these are cited as preferred examples, which are thiourea derivatives such as 1,3-diphenylthiourea, triethylthiourea, 1-ethyl, 3-(2-thiazoryl)thiourea, etc., rhodanine derivatives, dithiacarbamines, polysulfide organic compounds, simple substance sulfur, etc. As simple substance sulfur, α-sulfur belonging to the orthorhombic system is preferred.

Reduction sensitization is preferably employed along with other sensitization. The reduction sensitization is preferably carried out during the growth of silver halide grains. Methods to carry out the reduction sensitization during the grain growth include not only a method in which the reduction sensitization is carried out in the state where the silver halide grains are growing, but also a method in which the reduction sensitization is carried out in the state where the growth of the silver halide grains is for some time stopped and thereafter, silver halide grains subjected to the reduction sensitization are grown.

Gold sensitizers include chloroauric acid, gold thiosulfate, gold thiocyanate and in addition, gold complexes of thioureas, rhodanines, and other various compounds.

Though added amounts of a selenium sensitizer, tellurium sensitizer, sulfur sensitizer, reduction sensitizer, and gold sensitizer are not definite depending on types of silver halide emulsions, types of employed compounds, ripening conditions, etc., generally $1\times10^{-4}$ to $1\times10^{-9}$ mole is preferably employed per mole of silver halide, and $1\times10^{-5}$ to $1\times10^{-8}$ mole is more preferably employed.

The addition method of the selenium sensitizer, tellurium sensitizer, sulfur sensitizer, reduction sensitizer and gold sensitizer may be in such a manner that sensitizers are dissolved in water or any of alcohols, or in addition to these, inorganic or organic solvent is added in the form of a solution, or added in the form of dispersion obtained by emulsify dispersing employing water-insoluble solvent or media such as gelatin.

The silver halide photographic emulsion of the present invention can be subjected to spectral sensitization employing a sensitizing dye and optional sensitizing dyes may be employed. For example, cyanine dyes can be preferably employed. In that case, compounds S-1 through S-124 can be preferably employed which are represented by general formulas (I), (II), and (III) described in Japanese Patent Publication Open to Public Inspection No. 1-100533.

Further, when the above-mentioned dye is added, at least two dyes are employed in combination. In this case, at least two dyes may be mixed and added at the same time, or added separately at the different time. Furthermore, the added amount is preferably between 1 and 1,000 mg per mole of silver, and is more preferably between 5 and 500 mg. Furthermore, prior to adding these dyes, potassium iodide is added and thereafter, the dyes are preferably added.

The sensitizing dye may be added at any optional time during the silver halide grain formation and the period prior to coating, but is preferably added prior to the completion of desalting.

When added, the pH of a reaction solution (generally in a reaction vessel) is preferably in the range of 4 to 10 and more preferably in the range of 6 to 9. The pAg of the reaction solution (reaction vessel) is preferably between 5 and 11.

The sensitizing dye can be directly dispersed into an emulsion. Furthermore, the dye can be dissolved in a suitable solvent, for example, methanol, ethanol, acetone, water, pyridine or the mixture thereof and added in the form of a solution. Furthermore, in order to dissolve the dye, ultrasonic wave can be employed. Furthermore, without dissolving a water-insoluble sensitizing dye in water, the dye may be added in the form of a fine dye particle dispersion prepared employing a high speed impeller.

In the present invention, as matting agents, employed can be fine particles of a homopolymer of polymethyl methacrylate or a polymer of methyl methacrylate with methacrylic acid, organic compounds such as starch, etc., inorganic compounds such as amorphous silica, titanium dioxide, strontium nitrate, barium sulfate, etc. described in U.S. Pat. Nos. 2,992,101, 2,701,245, 4,142,894, and 4,396,706. The particle size is preferably between 0.6 and 10 $\mu$m, and is more preferably between 1 and 5 $\mu$m.

In the surface layer of the photographic element of the present invention, as lubricants, employed can be silicone compounds described in U.S. Pat. Nos. 3,489,576, 4,047,958, etc., colloidal silica described in Japanese Patent Publication No. 56-23139, and besides these, paraffin wax, higher fatty acid esters, starch derivatives, etc.

In the constitution layer of the photographic element of the present invention, as plasticizers, added can be polyols such as trimethylolpropane, pentanediol, butanediol, ethylene glycol, glycerin, etc.

Furthermore, in the constitution layer of the photographic element of the present invention, with the object of improving pressure resistance, polymer latex can be incorporated. As polymers can be preferably employed homopolymers of alkylester of acrylic acid or a copolymer with acrylic acid, styrene, etc., styrene-butadiene copolymer, and polymer or copolymer comprised of monomers having an active methylene group, a water-soluble group or a crosslinking group with gelatin employed as a binder. Specifically, in order to enhance affinity with gelatin employed as a binder, are most preferably employed copolymers of monomers having a water-soluble group comprised of hydrophobic monomers such as acrylic acid alkyl esters, hydrophobic monomers such as styrene, etc. as a main component. Preferred examples of monomers having a water-soluble group include acrylic acid, methacrylic acid, maleic acid, 2-acrylamide-2-methylpropanesulfonic acid, styrenesulfonic acid, etc., and preferred examples of monomers having a crosslinking group with gelatin include acrylic acid glycidyl, methacrylic acid glycidyl, N-methylolacrylamide, etc.

When the photographic element of the present invention is employed as a medical X ray-sensitive material with emulsion layers on both sides, with the object of improving the image sharpness, a crossing light shielding layer is preferably provided. In order to absorb the crossing light, in the crossing light shielding layer, fine solid dye particle dispersion is incorporated. As such dyes, if these have, for example, a structure so as to be soluble in an alkali solution with a pH of not less than 9 and insoluble in a solution with a pH of not more than 7. In terms of improved decolorization during development processing, are preferably employed compounds represented by general formula (1) described in Japanese Patent Publication Open to Public Inspection No. 6-308670.

In a preferred developer which develops the photographic element of the present invention, as developing agents, employed are preferably dihydroxybenzenes, for example, hydroquinone, para-aminophenols, for example, p-aminophenol, N-methyl-p-aminophenol, 2,4-diaminophenol, etc., 3-pyrazolidones, for example, 1-phenyl-3-pyrazolidones such as 1-phenyl-3-pyrazolidone, 1-phenyl-4-methyl-4-hydroxymethyl-pyrazolidone, 5,5-dimethyl-1-phenyl-3-pyrazolidone, etc. These are preferably employed in combination.

Furthermore, the application amount of the above-mentioned para-aminophenols and 3-aminopyrazolidones is preferably 0.004 mole/liter, and is more preferably between 0.04 and 0.12 mole/liter.

Furthermore, the total number of moles of dihydroxybenzenes, para-aminophenols, and 3-pyrazolidones incorporated in all these developing solution constituting components is preferably not more than 0.1 mole/liter.

As preservatives, incorporated may be sulfite salts, for example, potassium sulfite and sodium sulfite, reductons, for example, piperidinohexose reducton, etc. These are employed preferably in an amount of 0.2 to 1 mole/liter and more preferably in an amount of 0.3 to 0.6 mole/liter. Furthermore, the addition of a large amount of ascorbic acids results in stabilization of processing.

Alkali agents include pH controlling agents such as sodium hydroxide, potassium hydroxide, sodium carbonate, potassium carbonate, sodium tertiary phosphate, and potassium tertiary phosphate. Furthermore, employed may be buffering agents such as borates described in Japanese Patent Publication Open to Public Inspection No. 61-28708, and sucrose, acetoxime, 5-sulfosalicylic acid, phosphates, carbonates, etc. described in Japanese Patent Publication Open to Public Inspection No. 61-28708. The content of these chemical agents is controlled so that the pH of the developer is between 9.0 and 13, and is referably between 10 and 12.5.

As solubilizing agents, incorporated can be polyethylene glycols and esters thereof, and as sensitizers, incorporated can be those, such as, for example, quaternary-ammonium salts. Development accelerators and surface active agents can be incorporated.

As silver sludge minimizing agents, preferably employed are silver stain retarding agents described in Japanese Patent Publication Open to Public Inspection No. 56-106244; sulfide and disulfide compounds described in Japanese Patent Publication Open to Public Inspection No. 3-51844; and cysteine derivatives or triazine compounds described in Japanese Patent Application No. 4-92947.

As organic restrainers, employed are azole series organic antifoggants, for example, indazole series, imidazole series, benzimidazole series, triazole series, benztriazole series, tetrazole series and thiadiazole series compounds.

As inorganic restrainers, incorporated are sodium bromide, potassium bromide, potassium iodide, etc. In addition to these, employed may be those described in L.F.A. Maison, "Photographic Processing Chemistry", published by Focal Press Ltd. (1966), pages 226 to 229, U.S. Pat. Nos. 2,193,015 and 2,592,364, Japanese Patent Publication Open to Public Inspection No. 48-64933, etc. Of chelating agents which conceal calcium ions in city water, as organic chelating agents, preferably employed are chelating agents with a stabilization constant of not less than 8 with iron, described in Japanese Patent Publication Open to Public Inspection No. 1-193853. As inorganic chelating agents, there are sodium hexametaphospahte, calcium hexametaphosphate, and polyphosphates.

As development hardeners, dialdehyde compounds may be employed. In this case, glutaraldehyde is preferably employed.

The replenishment in the present invention is carried out to replenish an amount equivalent to processing exhaustion and oxidation exhaustion, and at a replenishment rate of 35 to 98 milliliters per $m^2$ of photographic element. As replenishment methods, there may be employed replenishment in accordance with width and transport speed as described in Japanese Patent Publication Open to Public Inspection No. 55-126242; area replenishment described in Japanese Patent Publication Open to Public Inspection No. 60-104946; and area replenishment controlled by the number of continuously processed sheets described in Japanese Patent Publication Open to Public Inspection No. 1-149156.

As preferred fixers, fixing materials can be incorporated which are commonly employed in this industrial society. The pH is not less than 3.8, and is preferably between 4.2 and 5.5.

As fixing agents, employed are thiosulfates such as ammonium thiosulfate, sodium thiosulfate, etc., and in terms of a rate of fixing, ammonium thiosulfate is particularly preferred. The concentration of the above-mentioned ammonium thiosulfate is preferably in the range of 0.1 to 5 moles/liter, and is more preferably in the range of 0.8 to 3 moles/liter.

The fixer of the present invention may be one which carries out acid hardening. In this case, as hardeners, aluminum ions are preferably employed. For example, in the form of aluminum sulfate, aluminum chloride, potassium alum, etc. aluminum ions are preferably used.

In addition, into the fixer of the present invention, incorporated can be, if desired, preservers such as sulfites, bisulfites, etc., pH buffers such as acetic acid, boric acid, etc., pH adjusting agents such as inorganic acids (sulfuric acid and nitric acid) and organic acids (citric acid oxalic acid, malic acid, etc.), various types of acid such as hydrochloric acid and metal hydroxides (potassium hydroxide and sodium), and chelating agents having water softening capability.

Fixing accelerators include, for example, thiourea derivatives described in Japanese Patent Publication Nos. 45-35754, 58-122535, and 58-122536, and thioethers described in U.S. Pat. No. 4,126,459, etc.

Further, the silver halide emulsion layer of the present invention is preferably subjected to swelling at a swelling ratio of 160 to 250 percent during development processing, and the layer thickness after swelling is preferably not more than 70 $\mu$m. When the swelling ratio exceeds 250 percent, incomplete drying is caused and for example, during automatic processor processing, particularly, quick processing, conveyance defects are also caused. Furthermore, when the swelling ratio is less than 150 percent, during processing, development unevenness and residual color tend to be degraded. The swelling ratio as described herein denotes a value obtained in such a manner that the difference between the layer thickness prior to processing and the layer thickness after swelling due to each processing is obtained and the resulting difference is divided by the thickness prior to processing, and multiplied by 100.

The photographic element of the present invention exhibits performances excellent in quick photographic processing employing an automatic processor which finishes total processing within 10 to 30 seconds. In the quick processing of the present invention, the temperature and time of each of development, fixing, etc. are about 25 to about 50 ° C. and not more than 15 seconds, respectively, and are preferably 30 to 40° C. and 2 to 10 seconds. In the present invention, the photographic element is subjected to development and fixing, and then water washing. In water washing, water saving processing can be carried out employing a two- or three-step counter-current washing system. Furthermore, when water washing is carried out employing a small amount of washing water, a squeezing roller cleaning tank is preferably provided. The temperature and time of water washing process are preferably between 5 and 50° C., and 2 and 10 seconds, respectively. In the present invention, the photographic element subjected to development, fixing, and water washing is dried through a squeezing roller. As drying systems, employed are individually or in combination, hot air counter-current drying, radiant drying employing a far-infrared radiant heater, and heat transfer drying employing a heat roller. The drying temperature and time are set between 40 and 100° C., and 4 and 15 seconds, respectively. The total processing time in the present invention denotes the total time from the time when the leading edge of a film strip is inserted into the inlet of an automatic processor to the time when the leading edge of the film strip comes out after passing through a development tank, a cross-over, a fixing tank, a cross-over, a washing tank, a cross-over, and a drying section. The silver halide photographic element of the present invention can be subjected to reduction of gelatin employed as a binder in the emulsion layer and protective layer, while maintaining the achieved pressure resistance. Accordingly, in the quick processing of the total processing time of 10 to 30 seconds, the photographic processing is carried out without degrading the development rate, fixing rate, and drying rate.

The examples of the present invention will now be described below.

EXAMPLES

Example 1
(Preparation of Silver Chlorobromide (Br/Cl=45/65) Tabular Grain Emulsion)

First, a seed emulsion was prepared as described below.

| A1 | Ossein gelatin | 37.5 g |
|---|---|---|
|  | KI | 0.625 g |
|  | NaCl | 16.5 g |
|  | Distilled water to make | 7500 ml |
| B1 | Silver nitrate | 1500 g |
|  | Distilled water to make | 2500 ml |
| C1 | KI | 4 g |
|  | NaCl | 140 g |
|  | Distilled water to make | 684 ml |
| D1 | NaCl | 375 g |
|  | Distilled water to make | 1816 ml |

Into solution A1 in a mix-stirring machine described in Japanese Patent Publication Nos. 58-58288 and 58-58289, 684 ml of solution B1 and all solution C1 were added over 1 minute at 40° C. The EAg was adjusted to 149 mV and the Ostwald ripening was carried out for 20 minutes. Thereafter, all the remaining solution A1 and all solution D1 were added over 40 minutes. During that, the EAg was controlled at 149 mV.

After completing the addition, desalting and water washing were immediately carried out and the resulting emulsion was termed Seed Emulsion EM-C. Electron microscopic observation revealed that the Seed Emulsion as described above was that not less than 50 percent of the total projection area was composed of tabular grains having a (100) plane as the principal plane with an average thickness of 0.07 μm and an average diameter of 0.5 μm; and the variation coefficient was 25 percent.

| A1 | Ossein gelatin | 29.4 g |
|---|---|---|
|  | HO—(CH$_2$CH$_2$O)$_n$—[CH(CH$_3$)CH$_2$O]$_{17}$—(CH$_2$CH$_2$O)$_m$H (n + m = 5 to 7) aqueous 10% methanol solution | 1.25 ml |
|  | Seed Emulsion EM-C | equivalent to 0.98 mole in terms of silver |
|  | Distilled water to make | 3000 ml |
| B2 | Aqueous 3.50N AgNO$_3$ solution | 2240 ml |
| C2 | NaCl | 455 g |
|  | KBr | 473 g |
|  | Distilled water to make | 2240 ml |
| D2 | Aqueous 1.75N NaCl solution | amount to control silver potential mentioned below |

Employing a mix-stirring machine described in Japanese Patent Publication Nos. 58-58288 and 58-58289, all solution B2 and all solution C2 were added into solution A2 at 40° C. over 110 minutes employing a simultaneous mixing method (double-jet method) so that the flow rate at the addition completion was three times as fast as that at the beginning, while growing grains. During this process, the silver potential was controlled at +100 mV employing solution D2.

After the addition completion, in order to remove excessive salts, flocculation desalting was carried out employing an aqueous Demol (manufactured by Kao Atlas Co.) solution and an aqueous magnesium sulfate solution.

Approximately 3,000 grains in the resulting emulsion was observed and measured employing an electron microscope. Shape analysis revealed that not less than 80 percent of the total projection area is composed of tabular grains with a (100) plane as the principal plane, an average diameter of 1.17 μm, and an average thickness of 0.12 μm, and the variation coefficient was 24 percent.

(Preparation of Fine Silver Iodide Grains)

| A3 | Ossein gelatin | 100 g |
|---|---|---|
|  | KI | 8.5 g |
|  | Distilled water to make | 2000 ml |
| B3 | AgNO$_3$ | 360 g |
|  | Distilled water to make | 605 ml |
| C3 | KI | 352 g |
|  | Distilled water to make | 605 ml |

Solution A3 was placed in a reaction vessel, and maintaining at 40° C. with stirring, solution B3 and solution C3 were added over 30 minutes at a constant rate employing a double jet method.

During addition, the pAg was maintained at 13.5 employing the commonly used pAg regulating means. The prepared silver iodide was a mixture consisting of β-AgI and γ-AgI with an average grain diameter of 0.06 μm. This emulsion was termed Fine Silver Iodide Grain Emulsion.

(Preparation of Fine Solid Particle Dispersion of Spectral Sensitizing Dye)

Spectral sensitizing dyes (A) and (B) described below in a ratio of 100:1 were previously added to water maintained at 27° C. and the resulting mixture was subjected to stirring over 30 to 120 minutes at 3,500 rpm employing a high speed stirrer (Dissolver) to obtain a fine solid particle dispersion of the spectral sensitizing dyes. At the time, the dispersion was prepared so that the concentration of sensitizing dye (A) became 2 percent.

Sensitizing dye (A): 5,5'-dichloro-9-ethyl-3,3'-di-(3-sulfopropyl)oxacarbocyanine salt anhydride Sensitizing dye (B): 5,5'-di-(butoxycarbonyl)-1,1'-diethyl-3,3'-di-(4-sulfobutyl)benzoimidazolocarbocyanine sodium salt anhydride (Chemical Sensitization)

Subsequently, the resulting emulsion underwent spectral and chemical sensitization employing the following methods to obtain a chemically sensitized emulsion.

After raising the temperature of the emulsion to 60° C., the above-mentioned fine solid particle dispersion was added so that the concentration of the sensitizing dye (A) was 460 mg per mole of silver. Thereafter, $7.0 \times 10^{-4}$ mole of ammonium thiocyanate, and $3.0 \times 10^{-6}$ mole of each of potassium chloroaurate, sodium thiosulfate, and triphenylphosphine selenide were added per mole of silver, and the mixture underwent optimum chemical sensitization. After adding $3 \times 10^{-3}$ mole of the above-mentioned fine silver iodide grain emulsion per mole of AgI, the resulting emulsion was stabilized utilizing $3 \times 10^{-2}$ mole of 4-hydroxy-6-methyl-1,3,3a,7-tetraazaindene (TAI).

Next, to the emulsion prepared as described above, additives described below were added to prepare an emulsion layer coating composition. At the same time, a crossing light shielding layer and a protective layer were also prepared.

(Preparation of Samples)

Onto each of both sides of a polyethylene terephthalate support subjected to coating of a tin oxide sol containing layer, a crossing light shielding layer coating composition, an emulsion layer coating composition, a protective layer's lower layer coating composition and a protective layer's upper layer coating composition were simultaneously multicoat dried in the order from the lower layer so as to obtain desired coating amounts described below. The values described below are coated amounts per m².

First Layer (Crossing Light Shielding Layer (AHL))

| | |
|---|---|
| Gelatin | 0.2 g |
| Fine solid particle dispersion dye (AH) | 20 mg |
| Sodium dodecylbenzenesulfonate | 5 mg |
| Compound (I) | 5 mg |
| 2,4-Dichloro-6-hydroxy-1,3,5-triazine sodium salt | 5 mg |
| Colloidal silica (average diameter of 0.014 µm) | 10 mg |
| Latex (L) | 0.1 g |
| Potassium polyethylene sulfonate | 50 mg |

Second Layer (Emulsion Layer (EML))

Each additive described below was added to the emulsion prepared as described above.

| | |
|---|---|
| Potassium tetrachloropalladate (II) | 100 mg |
| Compound (G) | 0.5 mg |
| 2,6-Bis(hydroxyamino)-4-diethylamino-1,3,5-triazine | 5 mg |
| t-Butylcatechol | 5 mg |
| Polyvinyl pyrrolidone (molecular weight of 10,000) | 20 mg |
| Styrene-maleic acid anhydride copolymer | 80 mg |
| Sodium polystyrenesulfonate | 80 mg |
| Trimethylolpropane | 50 mg |
| Diethylene glycol | 50 mg |
| Nitro-phenyl-triphenyl-phophonium chloride | 1 mg |
| Ammonium 1,3-dihydroxybenzene-4-sulfonate | 50 mg |
| Sodium 2-mercaptobenzimidazole-5-sulfonate | 5 mg |
| Compound (H) | 0.5 mg |
| n-C$_4$H$_9$OCH$_2$CH(OH)CH$_2$N(CH$_2$COOH)$_2$ | 20 mg |
| Compound (M) | 5 mg |
| Compound (N) | 5 mg |
| Latex (L) | 0.2 g |
| Compound of the present invention | (refer to Table 2) |
| Dextran (average molecular weight of 40,000) | 0.2 g |
| Sodium styrene sulfonate (molecular weight of about 500,000) | 7 mg |

Note that gelatin was regulated so that the total coating amount on one side became 1.8 g/m².

Third Layer (Protective Layer's Lower Layer (EPD))

| | |
|---|---|
| Gelatin | 0.2 g |
| Dioctyl phthalate | 0.1 g |
| Latex (L) | 0.2 g |
| Sodium polyacrylate (average molecular weight of 50,000) | 30 mg |
| Sodium styrene sulfonate (average molecular weight of about 500,000) | 7 mg |

Fourth Layer (Protective Layer's Upper Layer (EPU))

| | |
|---|---|
| Gelatin | 0.28 g |
| Matting agent composed of polymethyl methacrylate (area average particle diameter of 7.0 µm) | 27 mg |
| 2,4-Dichloro-6-hydroxy-1,3,5-triazine sodium salt | 10 mg |
| Latex (L) | 0.1 g |
| Colloidal silica (average particle diameter of 0.014 µm | 50 mg |

-continued

| | |
|---|---|
| Polyacrylamide (average molecular weight of 10,000) | 0.1 g |
| Sodium polyacrylate | 30 mg |
| Polysiloxane (S1) | 50 mg |
| Compound of the present invention | (refer to Table 2) |
| Compound (I) | 30 mg |
| Compound (J) | 2 mg |
| Compound (S-1) | 7 mg |
| Compound (K) | 15 mg |
| Compound (O) | 50 mg |
| Compound (S-2) | 5 mg |
| Compound (F-1) | 3 mg |
| Compound (F-2) | 2 mg |
| Compound (F-3) | 1 mg |
| Compound (F-4) | 10 mg |
| Compound (P) | 50 mg |

Note that the coated amount of each material was of one side and that the coated silver amount was adjusted to 1.0 g/m² on one side. The structures of compounds used in the above-mentioned Sample are described below.

Compound (G)

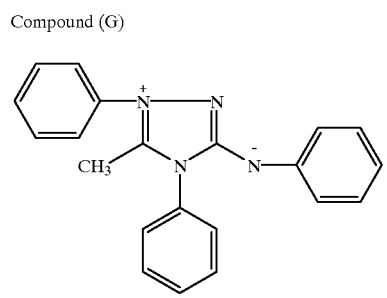

Compound (H)

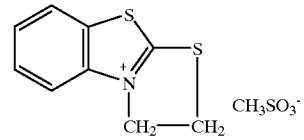

Compound (I)

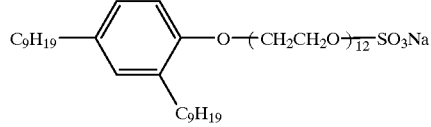

Compound (J)

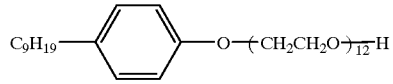

Compound (K)

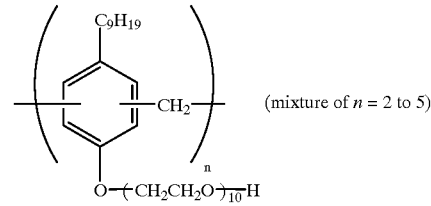

(mixture of n = 2 to 5)

-continued

Compound (S-1)

$$NaO_3S-CHCOO(CH_2)_2CH(CH_3)_2$$
$$\phantom{NaO_3S-}|$$
$$\phantom{NaO_3S-}CH_2COO(CH_2)_9CH_3$$

Compound (S-2)

$$NaO_3S-CHCOOCH_2(C_2F_4)_3H$$
$$\phantom{NaO_3S-}|$$
$$\phantom{NaO_3S-}CH_2COOCH_2(C_2F_4)_3H$$

Latex (L)

$$-(CH_2-CH)_{30}- \quad -(CH_2-C(CH_3))_{60}-$$
with $COOC_9H_{19}(i)$ and $COOCH(CH_2CH_2)_2CH_2$ $$-(CH_2-C(CH_3))_{10}-$$
with $COOCH_2-CH-CH_2$ (epoxide)

Polysiloxane (S1)

$$CH_3-Si(CH_3)_2-O-[Si(CH_3)_2-O]_n-Si(CH_3)_2-CH_3 \quad n \approx 1000$$

Fine solid particle dispersion dye (AH)

pyrazolone-furan dye with HOOC-phenyl, CN, and $N(CH_2CH_2OCH_3)_2$ substituents Compound (O)

$$C_{11}H_{23}CONH(CH_2CH_2O)_5H$$

Compound (M)

tetrazole-thiol with phenyl-$SO_3Na$ substituent

Compound (N)

tetrazole-thiol with phenyl-COOH substituent

Compound (P)

pyrrolidine-carbonyl-pyridinium-$CH_2CH_2SO_3^-$

Compound (F-1)

$$C_9F_{19}-O-(CH_2CH_2O)_{11}H$$

Compound (F-2)

$$C_8F_{17}-SO_2-N(C_3H_7)-(CH_2CH_2O)_{15}H$$

Compound (F-3)

$$C_8F_{17}-SO_2-N(C_3H_7)-(CH_2CH_2O)_4(CH_2)_4SO_3Na$$

Compound (F-4)

$$C_7F_{15}CH_2(OCH_2CH_2)_{13}OH$$

The prepared Samples were evaluated as described below. Table 2 shows these results.

1) Evaluation on Sensitivity

Coated dried Samples were kept standing at 23° C. and RH 55% for 3 days. Thereafter, each Sample was placed between radiographic intensifying screens, KO-250, subjected to X-ray exposure via a Penetrometer B Type, and subjected to processing using a developer and a fixer composed as described below, employing a roller-transport type automatic processor (SRX-501 manufactured by Konica Corp.) which was modified to increase the transport speed.

| Processing Conditions | Temperature | Time |
|---|---|---|
| Development | 38° C. | 7.0 seconds |
| Fixing | 37° C. | 4.0 seconds |
| Water Washing | 26° C. | 7.0 seconds |
| Squeezing | | 2.4 seconds |
| Drying | 58° C. | 4.0 seconds |
| Total (Dry to Dry) | | 24.4 seconds |

Developer Formula

Part A (For Use to Make 12 Liters)

| | |
|---|---|
| Potassium hydroxide | 450 g |
| Potassium sulfite (50% solution) | 2280 g |
| Diethylenetetraaminepentaacetic acid | 120 g |
| Sodium hydrogencarbonate | 132 g |
| 5-Methylbenzotriazole | 1.2 g |
| 1-Phenyl-5-mercaptotetrazole | 0.2 g |
| Hydroquinone | 340 g |
| Water to make | 5000 ml |

Part B (For Use to Make 12 Liters)

| | |
|---|---|
| Glacial acetic acid | 170 g |
| Triethylene glycol | 185 g |
| 1-Phenyl-3-pyrazolidone | 22 g |
| 5-Nitroindazole | 0.4 g |

Starter

| | |
|---|---|
| Glacial acetic acid | 120 g |
| Potassium bromide | 225 g |
| Water to make | 1 liter |

Fixer Formula
Part A (For Use to Make 18 Liters)

| | |
|---|---|
| Ammonium thiosulfate (70 weight/volume %) | 6000 g |
| Sodium sulfite | 110 g |
| Sodium acetate trihydrate | 450 g |
| Sodium citrate | 50 g |
| Gluconic acid | 70 g |
| 1-(N,N-dimethylamino)-ethyl-5-mercaptotetrazole | 18 g |

Part B

| | |
|---|---|
| Aluminum sulfate | 800 g |

A developer was prepared in such a manner that to about 5 liters of water, Part A and Part B were simultaneously added; dissolved while stirring, and water was added to make 12 liters and the pH was then adjusted to 10.40 using glacial acetic acid. The resulting developer was employed as a developer replenisher.

To 1 liter of this developer replenisher, 20 ml of the above-mentioned starter was added and the pH was adjusted to 10.26. The resulting solution was used as a working solution.

A fixer was prepared in such a manner that to about 5 liters of water, Part A and Part B were simultaneously added; dissolved while stirring, water was added to make 18 liters and the pH was adjusted to 4.4 using sulfuric acid and NaOH. The resulting solution was employed as a fixer replenisher.

Sensitivity was expressed as a relative value when the reciprocal of exposure energy which resulted in the density of fog+0.1 for Sample 1 was 100. Furthermore, fog value was shown as a net value which was obtained by subtracting the density of the film base.

2) Evaluation on Brittleness

Coated dried Samples were kept standing at 23° C. and RH 55% for 3 days and thereafter, were subjected to seasoning at the conditions of 40° C. and RH 0% for at least 1 hour. Then, in the same method as the ISO 6077 "Wedge brittleness test", the average of the point when cracks were first caused was obtained. The higher the value, the more brittle and more likely cracking was to be are caused.

3) Evaluation on Roller Marks

A 10×12 inch Sample was subjected to uniform exposure so as to yield a density of 1.0, and thereafter subjected to the above-mentioned processing. However, the development rack and cross-over rack from development to fixing which were used at the time were intentionally exhausted. Namely, rollers of each rack were subjected to formation of irregularity having a difference of about 10 μm on the whole surface due to the abrasion caused on the roller. The processed Sample which exhibited insufficient abrasion resistance showed formation of density unevenness with many fine spots. The degree of this density unevenness was visually evaluated according to the ranking described below.

5 no spot is formed
4 a few spots are formed but the degree of spot formation is at the level of no problem for commercial viability
3 some spots are formed and the degree of spot formation is within the tolerance limit such that no spotting wound be caused when processed using a normal rack
2 spots are formed and are occasionally caused even though processed using a normal rack
1 many spots are formed and are always formed even though processed using a normal rack

TABLE 2

| | | Additive Compound | | | | | |
|---|---|---|---|---|---|---|---|
| | | Addition Layer | | | | | |
| No. | Emulsion layer | Protective Layer's Upper Layer | Added Amount (mg/m$^2$) | Sensitivity | Fog | Roller Mark | Brittleness (mm) |
| 1 Comp. | Comp. a | — | 300 | 100 | 0.008 | 4 | 50 |
| 2 Comp. | Comp. a | — | 600 | 100 | 0.012 | 5 | 85 |
| 3 Comp. | Comp. b | — | 300 | 95 | 0.004 | 2 | 2 |
| 4 Comp. | — | Comp. b | 300 | 95 | 0.004 | 2 | 0 |
| 5 Comp. | Comp. b | — | 600 | 90 | 0.004 | 3 | 4 |
| 6 Comp. | Comp. b | Comp. b | 400 200 | 90 | 0.004 | 3 | 2 |
| 7 Inv. | K-1 | — | 300 | 100 | 0.002 | 4 | 0 |
| 8 Inv. | — | K-1 | 300 | 100 | 0.002 | 4 | 0 |
| 9 Inv. | K-1 | — | 600 | 100 | 0.002 | 5 | 0 |
| 10 Inv. | K-1 | K-1 | 400 200 | 100 | 0.002 | 5 | 0 |
| 11 Inv. | K-2 | — | 300 | 100 | 0.002 | 4 | 0 |
| 12 Inv. | K-2 | — | 600 | 100 | 0.002 | 5 | 0 |
| 13 Inv. | K-8 | — | 300 | 100 | 0.002 | 3 | 0 |
| 14 Inv. | K-8 | — | 600 | 100 | 0.002 | 4 | 0 |
| 15 Inv. | K-13 | — | 300 | 100 | 0.002 | 4 | 0 |
| 16 Inv. | K-13 | — | 600 | 100 | 0.002 | 5 | 0 |
| 17 Inv. | K-16 | — | 300 | 100 | 0.002 | 4 | 0 |
| 18 Inv. | K-16 | — | 600 | 100 | 0.002 | 5 | 0 |
| 19 Inv. | K-17 | — | 300 | 100 | 0.002 | 4 | 0 |
| 20 Inv. | K-17 | — | 600 | 100 | 0.002 | 5 | 0 |

Comp.: Comparative
Inv.: Present Invention

Further, Comparative a is colloidal silica (Snowtex C manufactured by Nissan Kagaku Co., Ltd.) and Comparative b is fine composite particle P-2 described in Synthesis Example 1 of Japanese Patent Publication Open to Public Inspection No. 9-218488.

As can clearly be seen in Table 2, the present invention can provide an excellent photographic element which exhibits high sensitivity, minimum fog, roller mark, and sufficient layer strength.

Example 2

Sample Nos. 2, 5, 9, 12, 16, 18, and 20, prepared in Example 1, were subjected to X-ray exposure and each Sample was then subjected to processing using the developer and fixer in Example 1 under the conditions described below until running equilibrium was established to prepare Running Equilibrium Solutions 1 and 2, while employing the automatic processor in Example 1.

| Processing Conditions | Temperature | Time |
| --- | --- | --- |
| Development | 38° C. | 7.0 seconds |
| Fixing | 37° C. | 4.0 seconds |
| Water Washing | 26° C. | 7.0 seconds |
| Squeezing | | 2.4 seconds |
| Drying | 58° C. | 4.0 seconds |
| Total (Dry to Dry) | | 24.4 seconds |

| Replenishment conditions | Running Equilibrium Solution 1 per 10 × 12 inch sheet | Running Equilibrium Solution 2 |
| --- | --- | --- |
| Developer replenishment rate | 14.0 ml (180 ml/m²) | 7.0 ml (90 ml/m²) |
| Fixer replenishment rate | 14.0 ml (180 ml/m²) | 7.0 ml (90 ml/m²) |

Sample Nos. 2, 5, 9, 12, 16, 18, and 20, prepared in Example 1, were processed under the above-mentioned conditions using Running Equilibrium Solution 1 (Condition 1) and Running Equilibrium 2 (Condition 2), and sensitivity and roller marks were evaluated. Table 3 shows these results.

TABLE 3

| Sample of Example 1 No. | Sensitivity | | Fog | | Roller Marks | |
| --- | --- | --- | --- | --- | --- | --- |
| | Condition 1 | Condition 2 | Condition 1 | Condition 2 | Condition 1 | Condition 2 |
| 2 Comparative | 95 | 90 | 0.012 | 0.020 | 5 | 2 |
| 5 Comparative | 80 | 60 | 0.004 | 0.008 | 3 | 2 |
| 9 Present Invention | 100 | 90 | 0.002 | 0.002 | 5 | 5 |
| 12 Present Invention | 100 | 90 | 0.002 | 0.002 | 5 | 5 |
| 16 Present Invention | 100 | 90 | 0.002 | 0.002 | 5 | 5 |
| 18 Present Invention | 100 | 90 | 0.002 | 0.002 | 5 | 5 |
| 20 Present Invention | 100 | 90 | 0.002 | 0.002 | 5 | 5 |

As can clearly be seen in Table 3, it is found that the present invention can provide an excellent photographic element which exhibits minimum sensitivity decrease, minimum fog, and no roller mark formation during ultra-quick processing under low replenishment rate.

Based on the present invention, obtained was an excellent photographic element which exhibited minimum sensitivity decrease, minimum fog and no roller mark formation during ultrarapid processing under low replenishment rate and a processing method of the same.

What is claimed is:

1. A photographic element having a support and, provided thereon, a silver halide emulsion layer and a non light-sensitive hydrophilic colloidal layer wherein the silver halide photographic element comprises, in at least one of the emulsion layer or the non light-sensitive hydrophilic colloidal layer, inorganic particles bonded with a compound represented by the following formula (I) or (II),

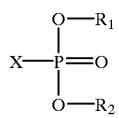

(I)

wherein X is a halogen atom or $OR_3$; and $R_1$, $R_2$ and $R_3$ are independently a hydrogen atom, an alkyl group which may be substituted or non-substituted, or an aryl group which may be substituted or non-substituted, provided that $R_1$, $R_2$ are not hydrogen atom at the same time,

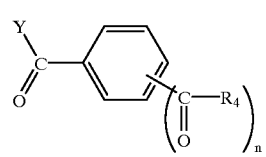

(II)

wherein Y is a halogen atom, and $R_4$ is a halogen atom or $OR_5$, $R_5$ being an alkyl group which may be substituted or non-substituted, or an aryl group which may be substituted or non-substituted; n is 1 or 2.

2. The photographic element of claim 1 wherein the inorganic particles are contained in the emulsion layer.

3. The photographic element of claim 1 wherein an average particle diameter of the inorganic particles is 1 nm to 5 μm.

4. The photographic element of claim 1 wherein the inorganic particles are colloidal silica, smectite, aluminum, oxide sol, or titanium oxide sol.

5. The photographic element of claim 1 wherein said compound has a boiling point of at least 100° C.

6. The photographic element of claim 1 wherein molecular weight of the compound is 100 to 1000.

7. The photographic element of claim 1 wherein number average diameter of the inorganic particles bonded with a high boiling point compound is 0.005 to 5 μm.

8. The photographic element of claim 1 wherein an amount of inorganic particles is 0.1 to 10 g/m².

9. The photographic element of claim 1 wherein a molecular weight of the compound is 100 to 1000 and a number average diameter of the inorganic particles is 0.005 to 5 μm.

10. A photographic element having a support and provided thereon a silver halide emulsion layer and a non light-sensitive hydrophilic colloidal layer, wherein the silver halide photographic element comprises inorganic particles bonded with a compound having a phosphoric acid portion or phthalic acid portion in the structure in the emulsion layer, boiling point of the compound being not lower than 100° C., said inorganic particles being colloidal silica, smectite, aluminum oxide sol, or titanium oxide sol, an average particle diameter of the inorganic particles being 1 nm to 5 μm, and the inorganic particles being 0.1 to 10 g/m².

11. The photographic element of claim 10 wherein a molecular weight of the compound is 100 to 1000, and the inorganic particles are colloidal silica, smectite, aluminum oxide sol, or titanium oxide sol.

12. The photographic element of claim 10 wherein a molecular weight of the compound is 100 to 1000.

13. The photographic element of claim 10 wherein a number average diameter of the inorganic particles bonded with the compound is 0.005 to 5 μm.

14. The photographic element of claim 10 wherein not less than 50 percent of the total projection area of all the silver halide grains in the silver halide emulsion layer is occupied by tabular grains having an aspect ratio of not less than 2.

15. The photographic element of claim 10 wherein a weight ratio of the compound to the inorganic particles is 0.1 to 100 weight percent.

16. The photographic element of claim 10 wherein the compound is represented by the following formula (I) or (II):

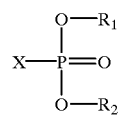  (I)

wherein X is a halogen atom or $OR_3$; and $R_1$, $R_2$ and $R_3$ are independently a hydrogen atom, an alkyl group which may be substituted or non-substituted, or an aryl group which may be substituted or non-substituted, provided that $R_1$, $R_2$ are not hydrogen atom at the same time,

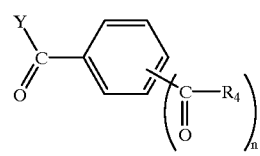  (II)

wherein Y is a halogen atom, and $R_4$ is a halogen atom or $OR_5$, $R_5$ being an alkyl group which may be substituted or non-substituted, or an aryl group which may be substituted or non-substituted; n is 1 or 2.

* * * * *